(12) United States Patent
Feltenberger

(10) Patent No.: US 7,735,386 B2
(45) Date of Patent: Jun. 15, 2010

(54) POWER GENERATION DEVICE

(75) Inventor: Bruce Feltenberger, Akron, OH (US)

(73) Assignee: Gravitational Energy Corporation, Cuyahoga Falls, OH (US)

( * ) Notice: Subject to any disclaimer, the term of this patent is extended or adjusted under 35 U.S.C. 154(b) by 85 days.

(21) Appl. No.: 11/820,973

(22) Filed: Jun. 21, 2007

(65) Prior Publication Data

US 2008/0245182 A1 Oct. 9, 2008

Related U.S. Application Data

(63) Continuation-in-part of application No. 11/155,346, filed on Jun. 17, 2005, now abandoned.

(51) Int. Cl.
*F16H 29/20* (2006.01)
*F16H 25/18* (2006.01)
*F03G 3/00* (2006.01)

(52) U.S. Cl. .................... 74/89.23; 74/99 R; 185/29

(58) Field of Classification Search ............ 74/20, 74/23, 59, 89, 89.23, 99 R, 107, 109, 112, 74/122, 126, 127; 185/27, 29
See application file for complete search history.

(56) References Cited

U.S. PATENT DOCUMENTS

| | | | | |
|---|---|---|---|---|
| 348,780 | A | * | 9/1886 | Sattles .................... 185/4 |
| 847,229 | A | * | 3/1907 | Branam ................... 185/29 |
| 2,375,429 | A | * | 5/1945 | Martin .................... 416/36 |
| 3,538,756 | A | | 11/1970 | Coombs |
| 4,115,996 | A | | 9/1978 | Coy |
| 4,286,693 | A | * | 9/1981 | Sulzer .................... 188/378 |
| 2007/0137943 | A1 | * | 6/2007 | Duclos .................... 185/27 |

FOREIGN PATENT DOCUMENTS

WO   WO 03/102376 A2   12/2003

\* cited by examiner

*Primary Examiner*—Thomas R Hannon
*Assistant Examiner*—Phillip A Johnson
(74) *Attorney, Agent, or Firm*—Emerson, Thomson, Bennett; Timothy D. Bennett, Esq.

(57) ABSTRACT

A rigid arm pendulum is combined with a helical device attached to the pendulum horizontal axle to provide a double reciprocating action. While the pendulum reciprocates in rotary fashion about the axle, describing successive arcs of less than 360 degrees, the axle simultaneously produces a reciprocating action about its longitudinal centerline. A pumping action is thereby developed in line with the longitudinal centerline of the axle. This pumping (linear reciprocating) action can be utilized for a variety of requirements, including a hydraulic pump and a system to drive an electric generator.

11 Claims, 2 Drawing Sheets

POWER GENERATION DEVICE

RELATED APPLICATIONS

The present invention is a Continuation in Part of U.S. Ser. No. 11/155,346, filed on Jun. 17, 2005, which claims the benefit of U.S. Provisional Patent Application No. 60/580,568, filed on Jun. 18, 2004.

BACKGROUND OF THE INVENTION

1. Field of the Invention

The present invention relates generally to an energy generation device and, more particularly, to a device utilizing reciprocating rotational motion that can be transmitted to an oscillating linear motion that is more suitable to adapting for the transmission of energy.

2. Description of the Related Art

As is well known in the art, pendulums have long been known as providing an effective means for utilizing the momentum of a falling weight. So efficient is a pendulum at utilizing momentum that, once oscillating, it requires very little additional energy input to keep the pendulum in motion. This additional energy only needs to be equal to the energy losses experienced by the system due to various forms of friction.

Additionally and separately, electrical power generation systems utilize a wide array of technology that can capture rotating motions (from turbines, flywheels and the like) to generate electric power. Similarly, pumps can utilize either a rotating motion, or a reciprocating motion, to impart energy on a working fluid. In both cases, the ability to utilize the oscillating motion from a pendulum to drive such work output is not easily adapted. The back and forth oscillation of a pendulum results in direction changes sufficient to drive a clockwork, but the pulsating rotations of the axle are not well suited for driving a generator, powering a drill, driving a pump, or the like. Further, a search of the prior art did not disclose any patents that read directly on the claims of the instant invention.

Consequently, a need has been felt for providing an improved means of interfacing between conventional electrical or mechanical power generation processes and the pulsating movement of a pendulum axle, thereby enabling a pendulum to become an efficient prime mover requiring only intermittent impulses of energy input.

SUMMARY OF THE INVENTION

It is therefore an object of the present invention to provide an improved power generation device.

It is a feature of the present invention to provide an improved power generation device utilizing reciprocating rotational motion to impart the working force.

It is yet another feature of the present invention to provide an improved power generation device utilizing an oscillating pendulum to generate or transfer the driving force.

Briefly described according to one embodiment of the present invention, a rigid arm pendulum is combined with a helical axle to provide a double reciprocating action. While the pendulum reciprocates in rotary fashion about the horizontal axle, describing successively diminishing arcs of less than 360 degrees, the pendulum simultaneously causes the axle to reciprocate in a linear manner about its longitudinal centerline. Additionally, the pendulum can operate in this manner while maintaining arcs, which do not diminish, providing intermittent input energy impulses are introduced to the system and are equal in magnitude to the losses caused by all forms of friction including the workload. A pumping action is developed in line with the longitudinal centerline of the axle. This pumping (linear reciprocating) action can be utilized for a variety of requirements, including but not limited to a hydraulic pump, a linear electric generator and a linkage system connected to a flywheel, which can drive various forms of rotating machinery.

An advantage of the present invention is that it provides an easily adapted means of powering conventional mechanical, hydraulic or electrical equipment with reciprocating rotary motion.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
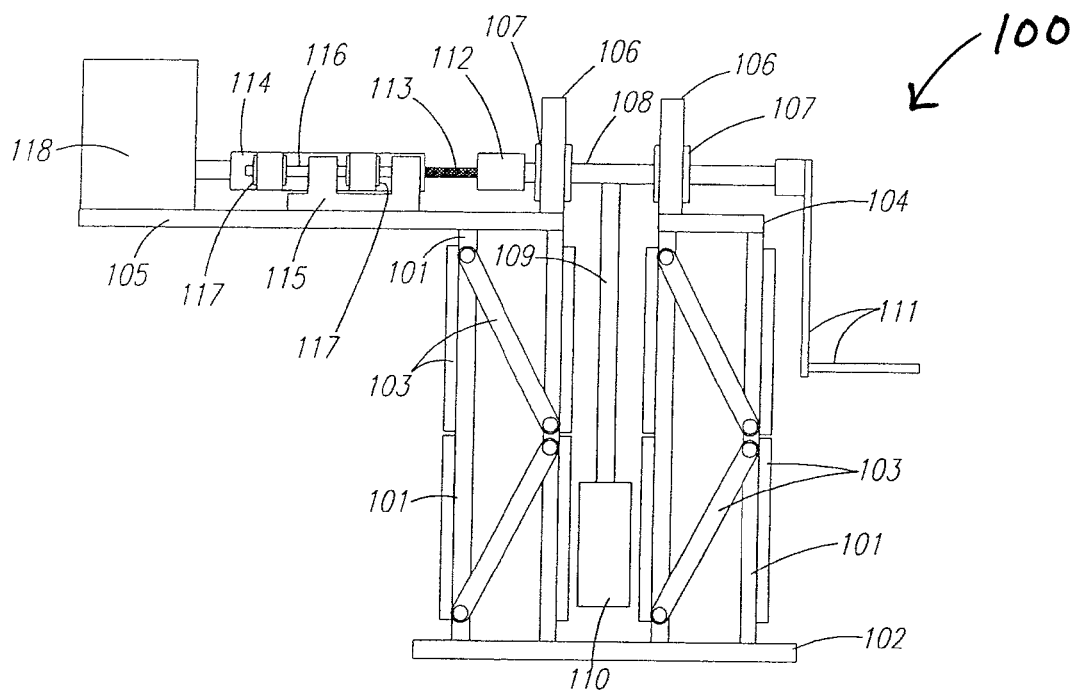
FIG. 1 is a side view of a pendulum in a stationary position according to one conceptual embodiment of the present invention.
Figure 2:
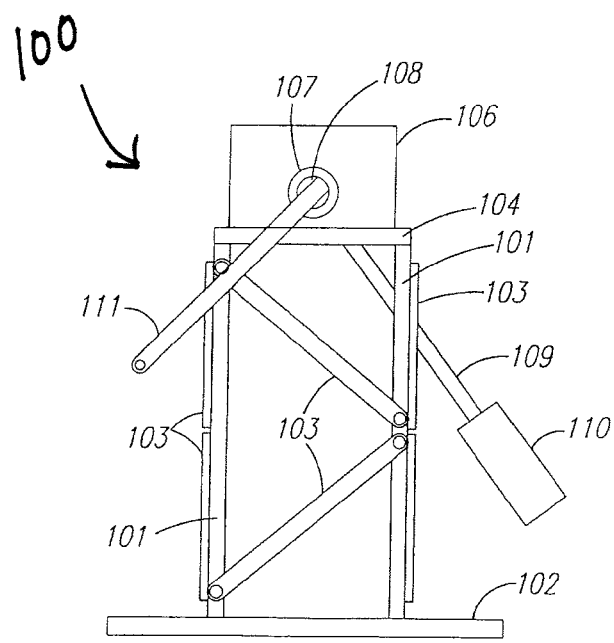
FIG. 2 is a front view of the image in FIG. 1 showing the pendulum in motion.

In order to describe the complete relationship of the invention, it is essential that some description be given to the manner and practice of functional utility and description of the prototype utilizing the present teachings of a power generation device 100 utilizing reciprocating rotational motion and demonstrated shown by FIGS. 1-4. FIG. 1 and FIG. 2 show a side view and front view, respectively, of the power generation device 100. Support frames 101, which are rigidly fastened to a base 102, are attached to a plurality of side supports 103 to provide rigidity to the support frame 101. Plates 104 and 105 are secured to the top of the support frames 101. Bearing blocks 106 are fastened to the plates 104, 105. Ball bearings 107 are positioned in the bearing blocks 106 and the bearing blocks 106 are assembled to the support frame 101 such that the bearings 106 are parallel and in line with each other. An axle 108 is mounted through the bearings so that it is capable of rotating freely. A pendulum bar 109 is rigidly fastened at a proximal end to the axle 108 and a weight 110 is fastened to a distal end of the pendulum bar 109, thereby comprising a rigid arm pendulum on a rotatable shaft or axle. A handle 111 is attached to one end of the axle 108 to provide a means for pushing or rotating the pendulum. A ball nut 112 is fastened to the opposite end of the axle 108 and a ball screw 113 is installed into the ball nut such that one end of the ball screw 113 can travel freely inward and outward through the ball nut while the opposite end of the ball screw is fastened to a slidable block 114 portion of a rotation arrestor, as described in greater detail below.

Figure 3:
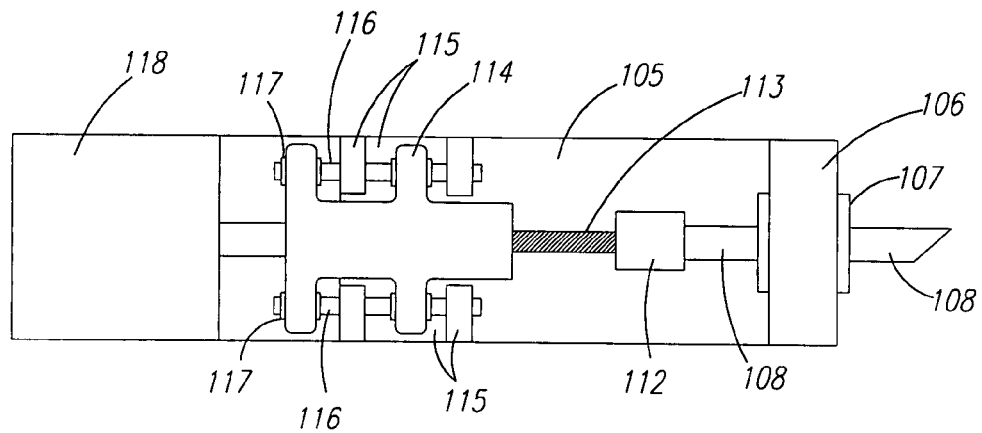
FIG. 3 is a close up top view of one embodiment of the rotation arrestor.

In conjunction with FIG. 3, the rotation arrestor assembly is comprised of a slidable block 114, a fixed block 115, two rods 116, which are securely fastened to the fixed block 115 and four linear bearings 117, which are securely fastened to the slidable block 114. The fixed block 115 is fastened to the plate 105 and one end of the slidable block 114 is fastened to a workstation such as a reciprocating pump 118. As the ball screw advances and retreats, the linear bearings 117 slide along the rods 116.

2. Operation of the Preferred Embodiment

FIG. 2 shows a front view depicting the pendulum in motion, and FIG. 3 shows an enlarged top view of the output end of the pendulum axle. In these views, it can readily be seen that as the axle 108 rotates, the ball nut 112 rotates, causing the ball screw 113, which has its opposite end rigidly fastened to the slidable rotation arrestor block 114, to screw inward or outward from the axle depending on the direction of rotation. As the ball screw moves in a linear manner, traveling along its longitudinal centerline, it alternatingly pushes and pulls the slidable rotation arrestor block 114 causing oscillating linear action in accordance with the rotating direction of the pendulum. The slidable rotation arrestor block 114 has its opposite end fastened to a reciprocating pump 118 and in this manner the pendulum's reciprocating rotational movement is converted to a linear reciprocating motion, which is used to produce work.

Figure 4:
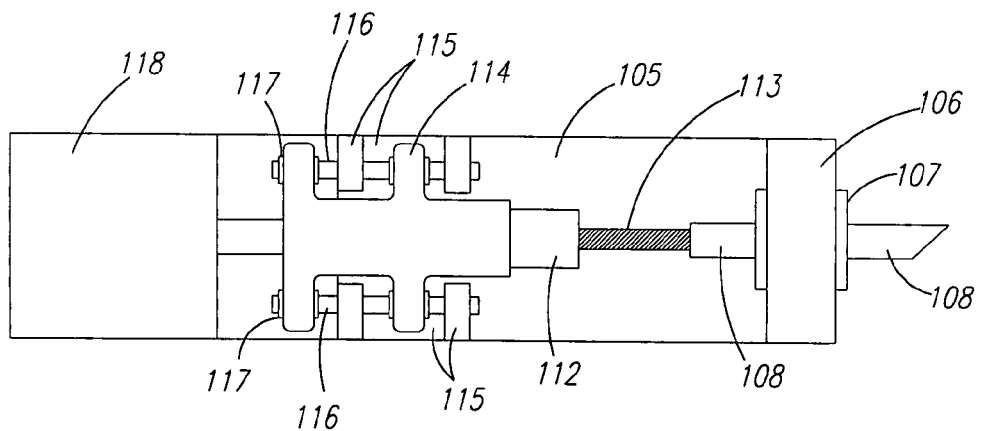
FIG. 4 shows another embodiment of the rotation arrestor.

FIG. 4 shows another embodiment of FIG. 3 where the ball nut 112 is rigidly fastened to the slidable rotation arrestor block 114. In this embodiment, one end of the ball screw 113 is rigidly fastened to the axle 108. The ball screw rotates with the axle causing the ball nut and the slidable rotation arrestor block 114 to be pulled or pushed in a linear oscillating manner.

In operation, the principles of the present invention succeeded in demonstrating that a rigid arm pendulum works like a lever arm set into motion. A large mechanical advantage exists near the axle longitudinal centerline. The ball screw and ball nut arrangement further demonstrated a mechanical advantage found in the inclined plane, which is essentially a circular wedge. Combining these two principles produced a potential force along the axial longitudinal centerline of several thousand pounds, even when using a weight at the end of the pendulum arm of only 72 Lbs. A further result of testing revealed that when a linear workload was introduced (such as a reciprocating pump) to the ball screw via the rotation arrestor, the increased friction caused by the workload was transmitted through the ball screw to the pendulum in a more efficient manner than when the same workload was introduced in a rotary manner such as using a pulley on the axle. This was confirmed by measuring the decrease in the size of the arc as the pendulum rotated due to linear loading versus radial loading.

It was further demonstrated that a given rotational arc of the pendulum could be maintained with a small manual impulse input once at the end of each over and back cycle of the pendulum. This input was sufficient to overcome all forms of friction and thereby maintain operation of the pendulum while producing useful output work. Such a device can be used for a variety of pumping applications, especially in situations where a higher force or pressure is required than what is otherwise available from a hand operated pumping system. Additionally, the output reciprocating system could also supply power to a hydraulic pump/motor system attached to an electric generator. In this manner, a hand operated rotary reciprocating mechanical system could produce a significant amount of electric power.

Additionally, because of the reciprocating nature of a pendulum, it is easier to provide intermittent impulse pushes manually than to continuously turn a hand wheel or push and pull on a lever arm. In this manner, one or two people operating the machine do not become fatigued as quickly and yet they produce significant continuous output work.

This described portion above represents the functional basis for the present invention, and allows the conversion of the reciprocating rotational motion of the pendulum assembly (or, alternately, an asymmetrical or unbalanced rotating cam or flywheel) into a simple reciprocating linear motion. Additionally, the momentum and power associated with the pendulum are concentrated and converted into a small reciprocating motion of much greater force concentration. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A power generation device comprising:
   a support structure;
   a first apparatus that provides reciprocating rotational motion to an axle having a longitudinal axis, wherein the first apparatus is a pendulum assembly supported to the support structure;
   a second apparatus that receives reciprocating rotational motion from the axle and provides corresponding oscillating linear motion along a line having a longitudinal axis, wherein the second apparatus comprises:
   a screw/nut assembly that receives reciprocating rotational motion from the axle and that provides corresponding oscillating rotational motion and oscillating linear motion along the line, wherein the screw/nut assembly is supported to the support structure and comprises: a ball nut; and, a ball screw that travels within the ball nut; and,
   a rotation arrester that receives oscillating rotational motion and oscillating linear motion from the screw/nut assembly and that provides corresponding oscillating linear motion along the line substantially without oscillating rotational motion, wherein the rotation arrester comprises: a first block rigidly fastened to the support structure; at least one rod that is rigidly fastened to the first block and that is substantially parallel to the longitudinal axis of the line; and, a second block that slides along the rod and that is operatively connected to the screw/nut assembly; and,
   wherein the longitudinal axis of the axle is substantially parallel to the longitudinal axis of the line.

2. The power generation device of claim 1 wherein the longitudinal axis of the axle is substantially collinear with the longitudinal axis of the line.

3. The power generation device of claim 1 wherein the pendulum assembly comprises:

a pendulum bar having a first end that is rigidly fastened to the axle;

a weight rigidly fastened to a second end of the pendulum bar; and, a handle rigidly fastened to a first end of the axle.

4. A power generation device comprising:

a support structure;

a pendulum assembly that is supported to the support structure and that provides reciprocating rotational motion to an axle having a longitudinal axis, wherein the pendulum assembly comprises: a pendulum bar having a first end that is rigidly fastened to the axle; a weight rigidly fastened to a second end of the pendulum bar; and, a handle rigidly fastened to a first end of the axle, wherein a second end of the axle is rigidly fastened to the screw/nut assembly; and, wherein the handle is manually operable to provide reciprocating rotational motion to the axle;

a screw/nut assembly that is supported to the support structure, that receives reciprocating rotational motion from the axle and, that provides corresponding oscillating rotational motion and oscillating linear motion along a line having a longitudinal axis;

a rotation arrester that is supported to the support structure, that receives oscillating rotational motion and oscillating linear motion from the screw/nut assembly and, that provides corresponding oscillating linear motion along the line substantially without oscillating rotational motion; and, wherein the longitudinal axis of the axle is substantially collinear with the longitudinal axis of the line during operation of the power generation device.

5. The power generation device of claim 4 wherein the handle comprises:

a first member that is substantially perpendicular to the axle and that has a first end that is rigidly fastened to the first end of the axle and; and, a second member that is substantially parallel to the axle and that has a first end that is attached to a second end of the first member.

6. The power generation device of claim 4 wherein the screw/nut assembly comprises:

a ball nut; and, a ball screw that travels within the ball nut.

7. The power generation device of claim 4 wherein the screw/nut assembly comprises:

a nut having a first end that is rigidly fastened to the axle and a second end; and, a screw having a first end that is operatively attached to the second end of the nut and a second end that is operatively attached to the rotation arrester.

8. The power generation device of claim 4 wherein the screw/nut assembly comprises:

a screw having a first end that is rigidly fastened to the axle and a second end; and, a nut having a first end that is operatively attached to the second end of the screw and a second end that is operatively attached to the rotation arrester.

9. The power generation device of claim 4 wherein the rotation arrester comprises:

a first block rigidly fastened to the support structure;

at least one rod that is rigidly fastened to the first block and that is substantially parallel to the longitudinal axis of the line; and, a second block that slides along the rod and that is operatively connected to the screw/nut assembly.

10. The power generation device of claim 4 wherein:

the support structure comprises:

a base;

a plurality of support frame members that are rigidly fastened to base; and, first and second plates that are secured to the tops of the support frame members and that are separated by a space;

the first end of the axle is supported to the first plate and the second end of the axle is supported to the second plate;

the pendulum bar moves within the space that separates the first and second plates when reciprocating rotational motion is applied to the axle;

the screw/nut assembly comprises a ball nut and a ball screw;

the rotation arrester comprises:

a first block rigidly fastened to the second plate;

a pair of rods that are rigidly fastened to the first block and that are substantially parallel to the longitudinal axis of the line; and, a second block that slides along the rods and that is operatively connected to the screw/nut assembly.

11. The power generation device of claim 4 further comprising:

a pump, wherein the rotation arrester provides oscillating linear motion to the pump.

* * * * *